United States Patent
Lim et al.

(10) Patent No.: US 11,950,177 B2
(45) Date of Patent: Apr. 2, 2024

(54) BLOCKING DELIVERY SERVICE

(71) Applicant: Verizon Patent and Licensing Inc., Basking Ridge, NJ (US)

(72) Inventors: Kevin Lim, Danville, CA (US); Craig Barth, Roanoke, TX (US); Brian Olson, Clayton, CA (US); Ye Huang, San Ramon, CA (US); Joseph Lee, Frisco, TX (US); Tony Ferreira, Fairfield, CT (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2 days.

(21) Appl. No.: 17/104,438

(22) Filed: Nov. 25, 2020

(65) Prior Publication Data

US 2022/0167246 A1    May 26, 2022

(51) Int. Cl.
*H04W 48/02* (2009.01)
*H04W 4/14* (2009.01)
*H04L 51/58* (2022.01)

(52) U.S. Cl.
CPC ............ *H04W 48/02* (2013.01); *H04W 4/14* (2013.01); *H04L 51/58* (2022.05)

(58) Field of Classification Search
None
See application file for complete search history.

(56) References Cited

U.S. PATENT DOCUMENTS

| | | | | |
|---|---|---|---|---|
| 6,101,393 A | * | 8/2000 | Alperovich | H04W 4/14 370/278 |
| 7,729,710 B2 | * | 6/2010 | Jie | H04L 51/212 455/412.2 |
| 2003/0083078 A1 | * | 5/2003 | Allison | H04M 15/8088 455/466 |
| 2007/0197212 A1 | * | 8/2007 | Marsico | H04W 4/16 455/433 |
| 2008/0153527 A1 | * | 6/2008 | Knotts | H04L 29/12047 455/466 |
| 2015/0081890 A1 | * | 3/2015 | Richards | G06F 9/45558 709/224 |
| 2015/0281153 A1 | * | 10/2015 | Murtagh | H04L 51/10 709/206 |
| 2020/0322779 A1 | * | 10/2020 | Jamoussi | H04M 15/8038 |

* cited by examiner

*Primary Examiner* — Kevin T Bates
*Assistant Examiner* — Dae Kim

(57) ABSTRACT

A method, a device, and a non-transitory storage medium are described in which an blocking delivery service is provided. The service may use an identifier of a source end device, destination address information associated with a destination end device, and configurable criteria as a basis to block delivery of application service layer data. The service may be configured to apply to end devices based on an addressing scheme of the service. The service may be configured on a network device that provides an application service. The service may block delivery without the use of class of service or subscriber provisioning.

20 Claims, 14 Drawing Sheets

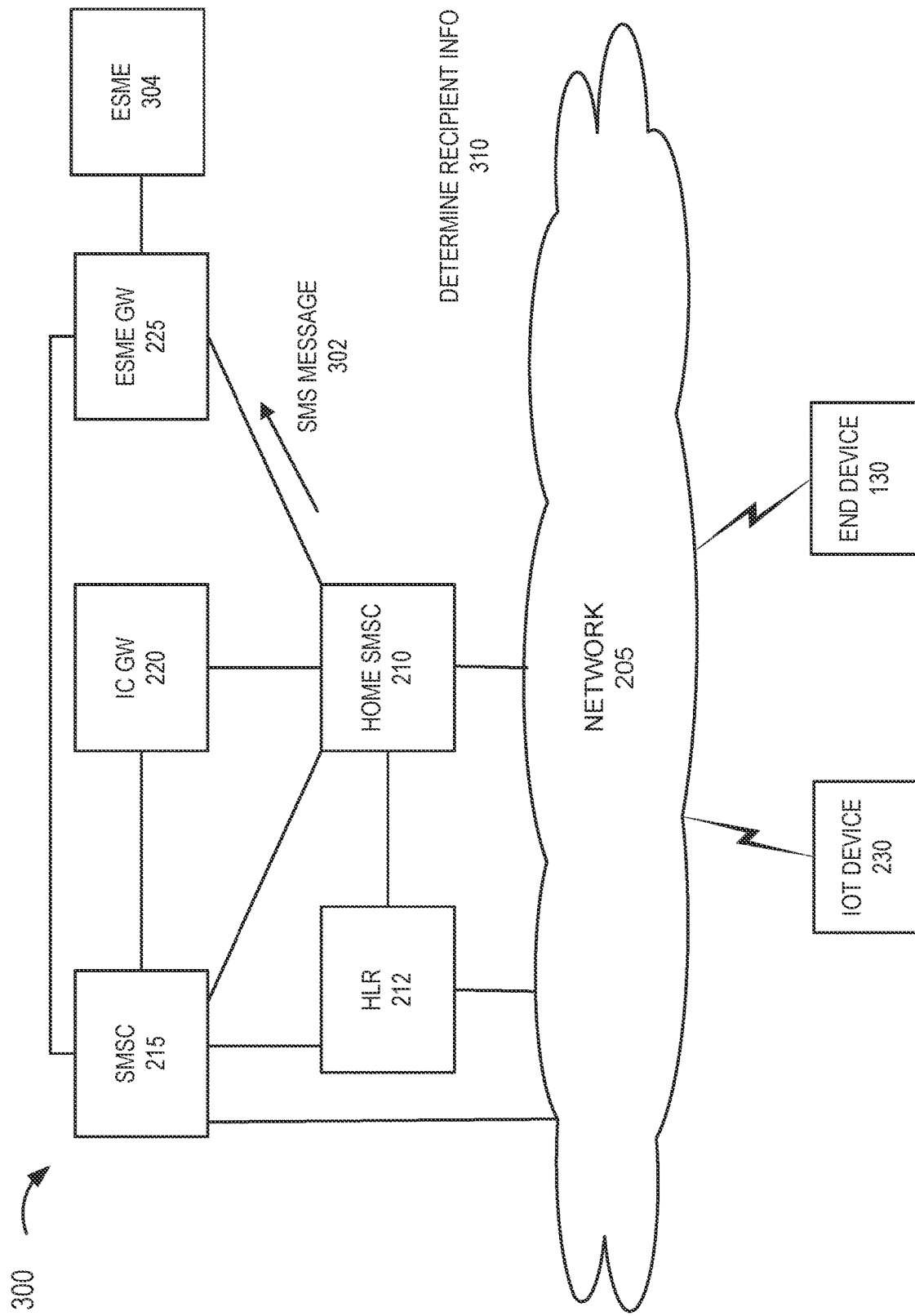

BLOCKING DELIVERY SERVICE

BACKGROUND

Mobile devices offer various services and applications to users, such as a web service, a communication service (e.g., e-mail, short messaging service (SMS), video chat, multimedia blocking delivery service (MMS), voice service, etc.), a media service (e.g., streaming and downloading of music, video, etc.), etc. Mobile devices may access these various services via a wireless network.

BRIEF DESCRIPTION OF THE DRAWINGS

FIGS. 3A-3I are diagrams illustrating an exemplary process of an exemplary embodiment of the blocking delivery service;

DETAILED DESCRIPTION

Figure 1:
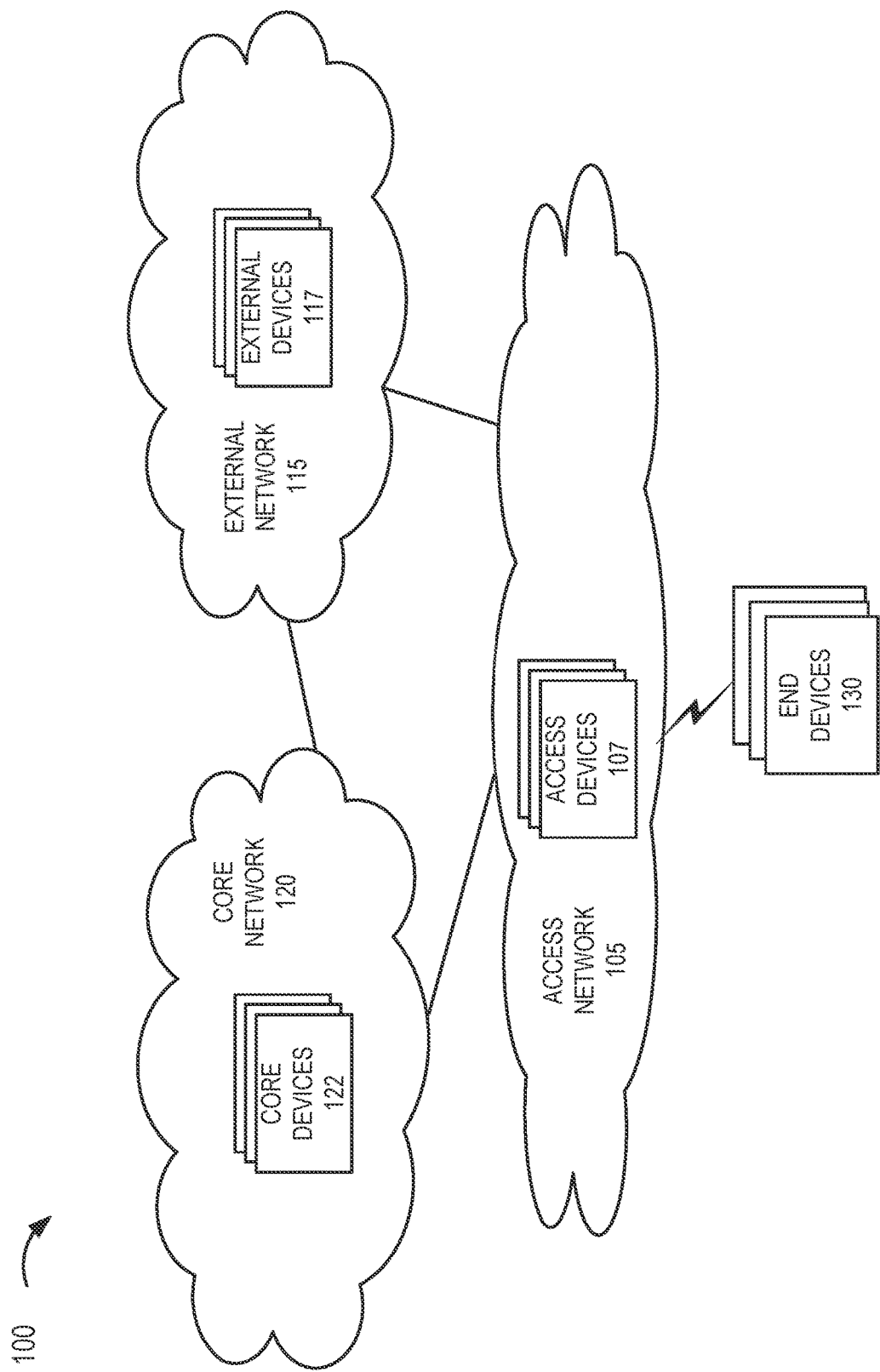
FIG. 1 is a diagram illustrating an exemplary environment in which an exemplary embodiment of a blocking delivery service may be implemented.

The following detailed description refers to the accompanying drawings. The same reference numbers in different drawings may identify the same or similar elements. Also, the following detailed description does not limit the invention.

A network operator, a service provider, or other entity may wish to restrict a communication service for a certain type of source or end device. For example, IoT devices may transmit messages to off-network destinations and/or other particular destinations. The use of a Class of Service (CoS) mechanism to restrict such messages from delivery may be problematic because CoS cannot support all types of messaging restrictions. Additionally, only one CoS may be assigned to each IoT device, and the CoS may need to be used for a different purpose. Thus, the ability to manage selective delivery of messages for a certain type of source or end device is problematic.

According to an exemplary embodiment, a blocking delivery service is described. According to an exemplary embodiment, the blocking delivery service may pertain to a messaging service, such as SMS or MMS. For example, the blocking delivery service may be implemented by a Short Messaging Service Center (SMSC) or a Multimedia Messaging Service Center (MMSC). According to such exemplary embodiments, the blocking delivery service may be implemented in a home (SMSC/MMSC) routing environment (e.g., local subscriber databases, home SCMC/MMSC) or a non-home (SMSC/MMSC) routing environment (e.g., centralized subscriber database, message routed to closest available SMSC/MMSC versus home SMSC/MMSC).

According to other exemplary embodiments, the blocking delivery service may pertain to other types of application services, such as other communication application services (e.g., e-mail, voice, rich communication service, etc.) or non-communication application service, as described herein. For example, the blocking delivery service may be implemented by an e-mail server, a Voice over Internet Protocol (VoIP) server, or another type of application service server.

According to an exemplary embodiment, the blocking delivery service may pertain to end devices of a certain type. For example, the blocking delivery service may pertain to Internet of Things (IoT) devices, such as a NarrowBand IoT (NB-IoT), an enhanced Machine Type Communication (eMTC) (also known as Cat-M1), Industrial IoT (IIoT), Massive IoT, Critical IoT, Broadband IoT, future generation IoT device, and/or other types of IoT devices that may provide machine-type communications. According to another exemplary embodiment, the blocking delivery service may pertain to a type of end device other than an IoT device. For example, one or more types of end devices and/or users associated with the end devices may be subject to the blocking delivery service, as described herein.

According to an exemplary embodiment, the blocking delivery service may block or allow application service data based on an addressing scheme. According to an exemplary embodiment, the blocking delivery service may use the addressing scheme that enables identification of an end device subject to the blocking delivery service. According to various exemplary embodiments, the addressing scheme may be, for example, an identifier of the end device, an identifier of a user associated with the end device, and/or another type of identifier that may relate to network access and/or use of a network. For example, the identifier may be implemented as a Mobile Station International Subscriber Directory Number (MSISDN), an International Mobile Subscriber Identity (IMSI), a Subscription Permanent Identifier (SUPI), an International Mobile Equipment Identity (IMEI), a network address (e.g., a Medium Access Control (MAC) address, an Internet Protocol (IP) address, etc.), an Internet Protocol Multimedia Subsystem Private Identifier (IMPI), a Mobile Equipment Identifier (MEID), or other suitable string (e.g., numeric, alphabetic, alpha-numeric, etc.) or unique identifier. According to some exemplary embodiments, the identifier may be of a non-standard length. For example, an MSISDN may have a length greater than 10 digits (e.g. 11 digits, 12 digits, 13 digits, 14 digits, 15 digits, etc.) that may indicate that the end device is subject to the blocking delivery service. Additionally, or alternatively, the MSISDN that may have a length greater than 10 and may include one or more digits of a particular value, which may indicate that the end device is subject to the blocking delivery service. For example, a source address of an SMS message that has a 13 digit MSISDN including a configurable value (e.g., 555, 999, or some other value) appended to the normal 10 digits may indicate the SMS message is subject to the blocking delivery service. According to some exemplary embodiments, the identifier may have a value within a certain range of values. For example, an MSISDN may be of a normal length (e.g., 10 digits pertaining to a North American Numbering Plan (e.g., ITU Zone 1)) but may have a value within a range of values that may indicate that the end device is subject to the blocking delivery service. The blocking delivery service may include logic to account for different telecom jurisdictions, numbering plans, countries, and so forth, for example.

According to an exemplary embodiment, the blocking delivery service may be configured to block application service data based on one or multiple criteria. The one or multiple criteria may be configurable. For example, with reference to a messaging service, the criterion may include that a message destined to a carrier network different from a carrier network of the originating end device is blocked. For example, the message may be blocked when its destination is an international destination or an off-network domestic destination. In this regard, the message may be blocked and not routed towards its destination via an Inter-Carrier (IC) SMS Gateway (GW) or via an IC MMS GW, for example. According to another example, the criterion may include that a message destined to an address other than an international destination and/or an off-network domestic destination is blocked. For example, the blocking delivery service may be configured with certain addresses that are to be blocked for delivery.

According to an exemplary embodiment, the blocking delivery service may generate and transmit an error message to the originating end device or for transmission to another destination (e.g., an administrative server or the like) when application service data is blocked. For example, the error message may include data indicating that a message (e.g., SMS, MMS, etc.) is blocked from delivery, for example.

According to an exemplary embodiment, the blocking delivery service may allow the delivery of application service data based on one or multiple criteria. The one or multiple criteria may be configurable. For example, with reference to a messaging service, the criterion may include that a message destined to an end device that has the same carrier as the originating end device is allowed for delivery. For example, an SMS message or an MMS message originating from an IoT device may be delivered to another IoT device or a non-IoT device when the originating and terminating end devices have the same network provider, SMS/MMS service provider, and/or wireless service provider. According to another example, the criterion may include that a message destinated to an application is allowed for delivery. For example, an SMS message may be routed via an External Short Messaging Entity (ESME) Short Message Peer-to-Peer Protocol (SMPP) GW towards an ESME. According to yet another example, the criterion may include that a message destinated to a permissible address under the addressing scheme is allowed for delivery.

In view of the foregoing, the blocking delivery service may provide for the blocking and allowance of application service data from a type of end device without the use of CoS or subscriber provisioning. For example, with reference to a messaging service, the blocking delivery service may block or allow the delivery of a message based on source and destination addresses/identifiers and provide a flexibility in the management of a communication service. The blocking delivery service may free up the use of CoS for other purposes, thus providing more flexibility to assign an additional attribute. Alternatively, the blocking delivery service may be implemented with CoS, which may require subscriber profile provisioning.

FIG. 1 is a diagram illustrating an exemplary environment 100 in which an exemplary embodiment of the blocking delivery service may be implemented. As illustrated, environment 100 includes access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or other type of network that may support a wireless service and/or an application service, as described herein.

The number, the type, and the arrangement of network devices, and the number of end devices 130 are exemplary. A network device may be implemented according to one or multiple architectures, such as a client device, a server device, a peer device, a proxy device, a cloud device, and/or a virtualized network device. Additionally, the network device may be implemented according to various computing architectures, such as centralized, distributed, cloud (e.g., elastic, public, private, etc.), edge network, fog network, and/or another type of computing architecture, and may be incorporated into various types of network architectures (e.g., software defined network (SDN), virtual network, logical network, network slice, etc.).

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication.

Access network 105 may include one or multiple networks of one or multiple types and technologies. For example, access network 105 may be implemented to include a 5G-access network (5G-AN) or a 5G-RAN, a future generation RAN (e.g., a 6G RAN or subsequent generation RAN). Access network 105 may include a legacy RAN (e.g., a Third Generation (3G) RAN, a 4G or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), an optical network, or another type of network that provides access to or can be used as an on-ramp to access network 105, external network 115, and/or core network 120.

Access network 105 may include different and multiple functional splitting, such as options 1, 2, 3, 4, 5, 6, 7, or 8 that relate to combinations of access network 105 and core network 120 including an Evolved Packet Core (EPC) network and/or a NG core (NGC) network, or the splitting of the various layers (e.g., physical layer, Media Access Control (MAC) layer, RLC layer, and PDCP layer, etc.), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), CA (e.g., intra-band, inter-band, contiguous, non-contiguous, etc.), edge and core network slicing, coordinated multipoint (CoMP), various duplex schemes (e.g., frequency division duplex (FDD), time division duplex (TDD), half-duplex FDD (H-FDD), etc.), and/or another type of connectivity service (e.g., non-standalone (NSA) NR, standalone (SA) NR, etc.).

According to some exemplary embodiments, access network 105 may be implemented to include various architectures of wireless service, such as, for example, macrocell, microcell, femtocell, picocell, metrocell, new radio (NR) cell, Long Term Evolution (LTE) cell, non-cell, or another type of cell architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, higher than mm wave, licensed radio spectrum, unlicensed radio spectrum, above mm wave), and/or other attributes or technologies used for radio communication.

Depending on the implementation, access network 105 may include one or multiple types of network devices, such as access devices 107. For example, access device 107 may include a next generation Node B (gNB), an evolved Long Term Evolution (eLTE) eNB, an eNB, a radio network controller (RNC), a remote radio head (RRH), a baseband unit (BBU), a radio unit (RU), a CU, a CU control plane (CU CP), a CU user plane (CU UP), a DU, a small cell node (e.g., a picocell device, a femtocell device, a microcell device, a home eNB, etc.), open network devices (e.g., O-RAN Centralized Unit (O-CU), O-RAN Distributed Unit (O-DU), O-RAN next generation Node B (O-gNB), O-RAN evolved Node B (O-eNB)), 5G ultra-wide band (UWB) nodes, a future generation wireless access device (e.g., a 6G wireless station, a seventh generation (7G) wireless station, etc.), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access. According to some exemplary implementations, access device 107 may include a combined functionality of multiple RATs (e.g., 4G and 5G functionality, 5G and 5.5G functionality, etc.) via soft and hard bonding based on demands and needs. According to some exemplary implementations, access device 107 may include an integrated functionality, such as a CU-CP and a CU-UP, or other integrations of split RAN nodes. Access device 107 may be an indoor device or an outdoor device.

External network 115 may include one or multiple networks of one or multiple types and technologies. For example, external network 115 may be implemented to include a service or an application-layer network, a cloud network, a private network, a public network, a multi-access edge computing (MEC) network (also known as a mobile edge computing network), a fog network, the Internet, a service provider network, the World Wide Web (WWW), an Internet Protocol Multimedia Subsystem (IMS) network, a Rich Communication Service (RCS) network, software defined network (SDN), a virtual network, a packet-switched network, a data center, or other type of network that may provide access to and may host an end device application, service, or asset (also referred to as an "application service").

Depending on the implementation, external network 115 may include various network devices such as external devices 117. For example, external devices 117 may include servers (e.g., web, application, cloud, etc.), mass storage devices, data center devices, network function virtualization (NFV) devices, containers, virtual machines, SDN devices, cloud computing devices, platforms, and other types of network devices, platforms, and/or architectures pertaining to various network-related functions (e.g., security, management, charging, billing, authentication, authorization, policy enforcement, development, etc.).

External devices 117 may host one or multiple types of application services. An application service may or may not pertain to the blocking delivery service, as described herein. For example, the application services may pertain to broadband services in dense areas (e.g., pervasive video, smart office, operator cloud services, video/photo sharing, etc.), broadband access everywhere (e.g., 50/100 Mbps, ultra low-cost network, etc.), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., SMS, MMS, etc.), voice, conferencing, instant messaging), video streaming, and/or other types of wireless application services.

According to an exemplary embodiment, external devices 117 may include a network device that provides the blocking delivery service, as described herein. For example, an SMSC may include logic that provides the blocking delivery service, as described herein. According to another example, an MMSC may include logic that provides the blocking delivery service, as described herein. According to yet another example, another type of application service and corresponding network device that provides the application service may include the blocking delivery service.

Core network 120 may include one or multiple networks of one or multiple network types and technologies. Core network 120 may include a complementary network of access network 105. For example, core network 120 may be implemented to include an NGC network, an Evolved Packet Core (EPC) of an LTE network, an LTE-Advanced (LTE-A) network, and/or an LTE-A Pro network, a future generation core network (e.g., a 6G or beyond core network, etc.), and/or another type of core network.

Depending on the implementation of core network 120, core network 120 may include various types of network devices that are illustrated in FIG. 1 as core devices 122. For example, core devices 122 may include a user plane function (UPF), a Non-3GPP Interworking Function (N3IWF), an access and management mobility function (AMF), a session management function (SMF), a unified data management (UDM) device, a unified data repository (UDR) device, an authentication server function (AUSF), a network slice selection function (NSSF), a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS). According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.).

End devices 130 include a device that may have computational and/or communication capabilities (e.g., wireless, wired, optical, etc.). End device 130 may be implemented as a mobile device, a portable device, a stationary device (e.g., a non-mobile device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of user equipment (UE)). End device 130 may be configured to execute various types of software (e.g., applications, programs, etc.). The number and the types of software may vary among end devices 130.

End device 130 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, etc.), various levels and genres of network slicing, DC service, and/or other types of connectivity services. Additionally, end device 130 may include one or multiple communication interfaces that provide one or multiple (e.g., simultaneous, interleaved, etc.) connections via the same or different RATs, frequency bands, carriers, network slices, and/or other communication medium (e.g., wired, etc.). The multimode capabilities of end device 130 may vary among end devices 130.

According to an exemplary embodiment, a type of end device 130 may be subject to the blocking delivery service, as described herein. The type of end device 130 may be a configurable parameter of the blocking delivery service. For example, the type of end device 130 may include an IoT device. For example as previously mentioned, the IoT device may include an NB-IoT, an eMTC device, an IIoT device, a Massive IoT device, a Critical IoT device, a Broadband IoT device, a future generation IoT device, and/or other types of IoT devices that may provide machine-type communications. According to other examples, the type of end device 130 may not include an IoT device or include an IoT device and another type of end device 130.

According to an exemplary embodiment, one or multiple applications of end device 130 may be subject to the blocking delivery service. For example, the application may include SMS, MMS, and/or another type of application service.

Figure 2:
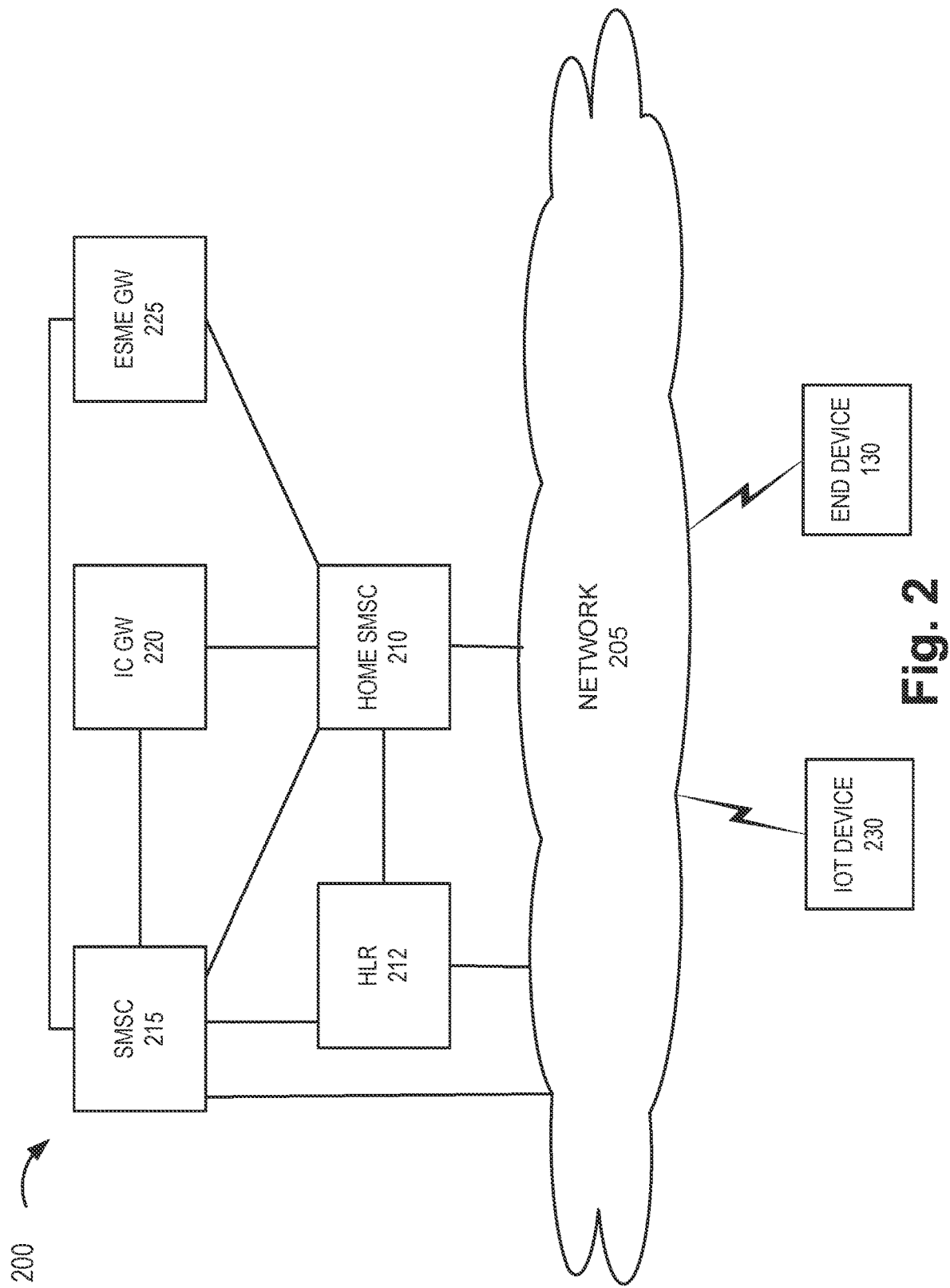
FIG. 2 is a diagram illustrating another exemplary environment in which an exemplary embodiment of the blocking delivery service may be implemented.

FIG. 2 is a diagram illustrating another exemplary environment 200 in which an exemplary embodiment of the blocking delivery service may be implemented. According to this example, the blocking delivery service pertains to an SMS service as the application service and the type of end device 130 as an IoT device. As illustrated, environment 200 includes a network 205, a home SMSC 210, a Home Location Register (HLR) 212, an SMSC 215, an IC GW 220, and an ESME GW 225. Environment 200 further includes an IoT device 230. According to some exemplary embodiments, home SMSC 210, HLR 212, SMSC 215, IC GW 220, and/or ESME GW 225 may reside in external network 115.

Network 205 may include access network 105 or access network 105 and core network 120, for example. Home SMSC 210 may be implemented as an SMSC. According to some exemplary scenarios, home SMSC 210 may be a home SMSC for IoT device 230, such as in a home-routed network. SMSC 215 may be implemented as an SMSC. Home SMSC 210 and SMSC 215 may each include logic that provides the blocking delivery service, as described herein. Home SMSC 210 and SMSC 215 may also each include logic of an SMSC. For example, Home SMSC 210 and SMSC 215 may store, forward, convert, and deliver SMS messages. The SMSC may store various types of information, such as a routing information (e.g., a routing table), subscriber information, CoS information, and so forth.

HLR 212 may store information pertaining to end device 130. For example, HLR 212 may store a database that includes identifiers (e.g., IMSI, MSISDN, etc.), location information pertaining to end device 130, status information pertaining to end device 130 (e.g., active in network, roaming information, whether a mobile/directory number is ported from another network etc.), and/or other configurable information pertaining to end device 130 and/or a user of end device 130. HLR 212 may provide a lookup service for Home SMSC 210 and SMSC 215.

IC GW 220 may include a network device that may provide inter-carrier communication services for SMS messages. For example, IC GW 220 may provide inter-carrier communication between different domestic carriers and/or international carriers.

ESME GW 225 may include a network device that may provide communication services for SMS messages. For example, ESME GW 225 may provide communication between an SMSC and an ESME. IoT device 230 may be an IoT device, and end device 130 has already been described.

According to other embodiments, additional, different, and/or fewer network devices may be implemented. For example, environment 200 may include an SMS-Interworking Function (SMS-IWF), a Signal Transfer Point (STP), an HSS, a UDM, a Visitor Location Register (VLR), a Mobile Switching Center (MSC), an integrated network device (e.g., an HSS/HLR or an HSS/UDM/HLR, etc.) and/or other types of network devices of relevance in support of the SMS service. The number, type, and arrangement of network devices are exemplary. For example, although not illustrated, there may be multiple IC GWs 220. For example, one IC GW 220 may support the routing of international destinations and another IC GW 220 may support the routing of domestic intercarrier destinations. For example, a mobile originating (MO) device may be associated with a user or a subscriber of one carrier (e.g., VERIZON) while a mobile terminating (MT) device may be associated with a user or a subscriber of another or different carrier. Also, for example, environment 200 may be implemented to include SMSCs of a non-home routed network. Additionally, the number and arrangement of communication links are exemplary.

As previously mentioned, the blocking delivery service may pertain to other types of application services and/or other types of end devices 130, as described herein. Additionally, for purposes of description, home SMSC 210 and SMSC 215 may be implemented as a home MMSC and an MMSC or an integration of SMS and MMS (e.g., home SMSC/MMSC, SMSC/MMSC, etc.). In this regard, SMS messages and/or MMS messages may be communicated in environment 200.

FIGS. 3A-3I are diagrams illustrating an exemplary process 300 of an exemplary embodiment of the blocking delivery service. Assume that IoT device 230 is an MO device pertaining to an SMS message. According to some exemplary scenarios, as described, end device 130 may be an MT device pertaining to the SMS message, as described herein.

Figure 3A:
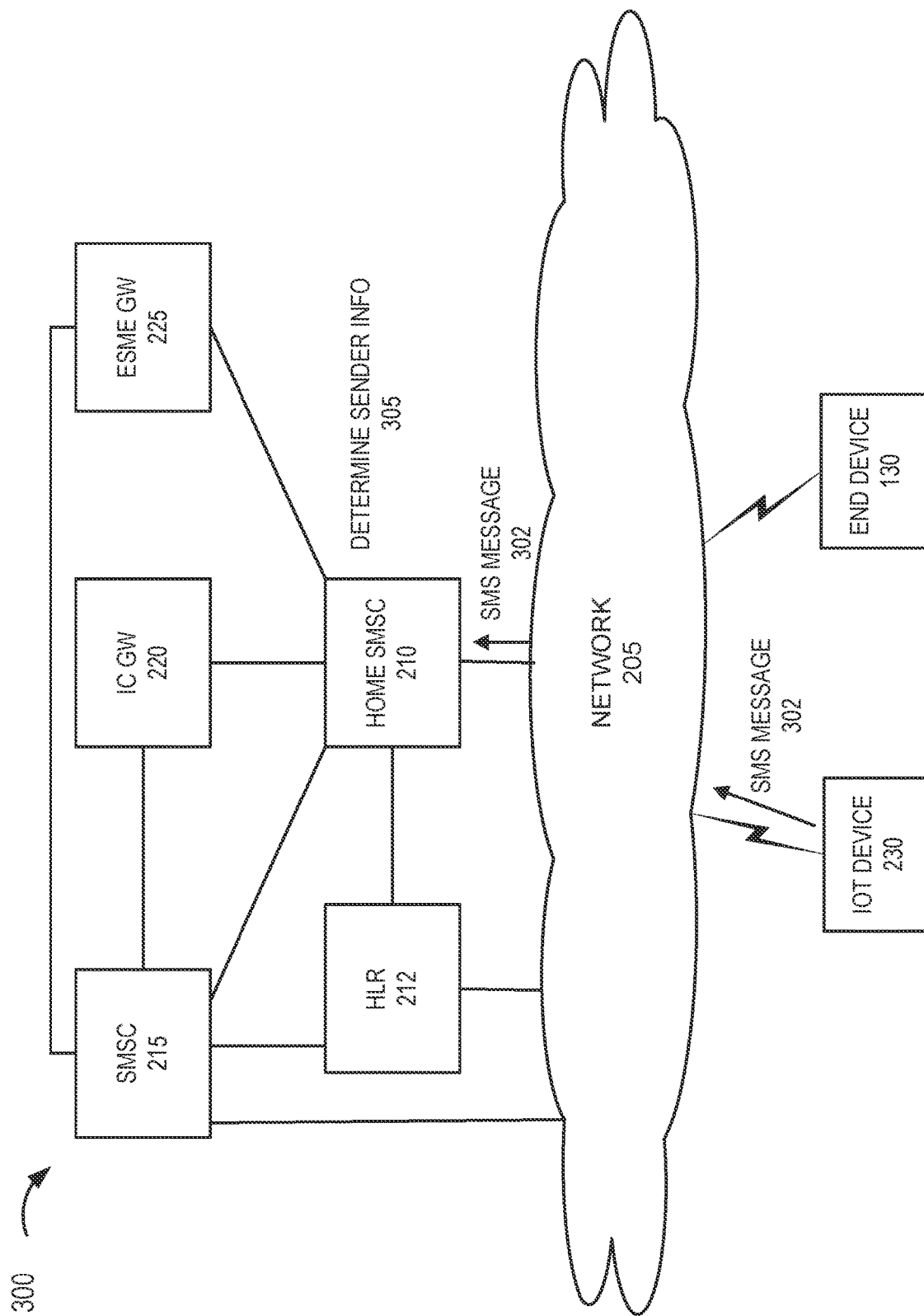

Referring to FIG. 3A, IoT device 230 generates and transmits an SMS message 302, which is received by home SMSC 210 via network 205. SMS message 302 may be destined to end device 130. In response, home SMSC 210 may determine sender information 305. For example, home SMSC 210 may determine whether it is the home SMSC for IoT device 230. Additionally, or alternatively, home SMSC 210 may determine whether IoT device 230 is provisioned for CoS handling. Home SMSC 210 may access local subscription information and/or HLR 212. The local subscription information and HLR 212 may include identifiers pertaining to the addressing scheme of the blocking delivery service. In this way, identifiers or destinations, among other information, may be determined by the blocking delivery service. According to this exemplary scenario, assume that home SMSC 210 is the home SMSC for IoT device 230, and there is no CoS configuration pertaining to subscriber/IoT device 230.

Figure 3B:
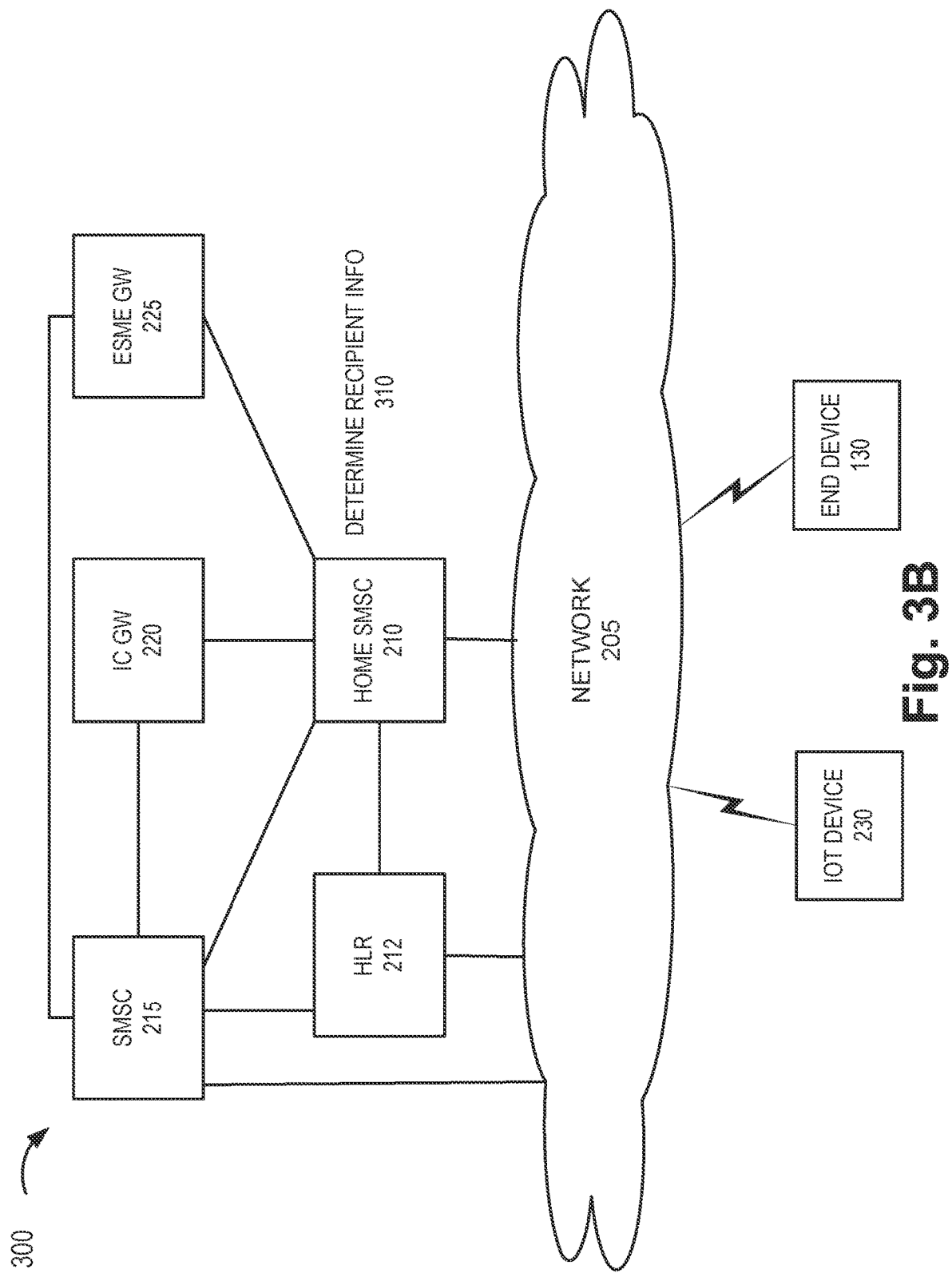
Figure 3C:
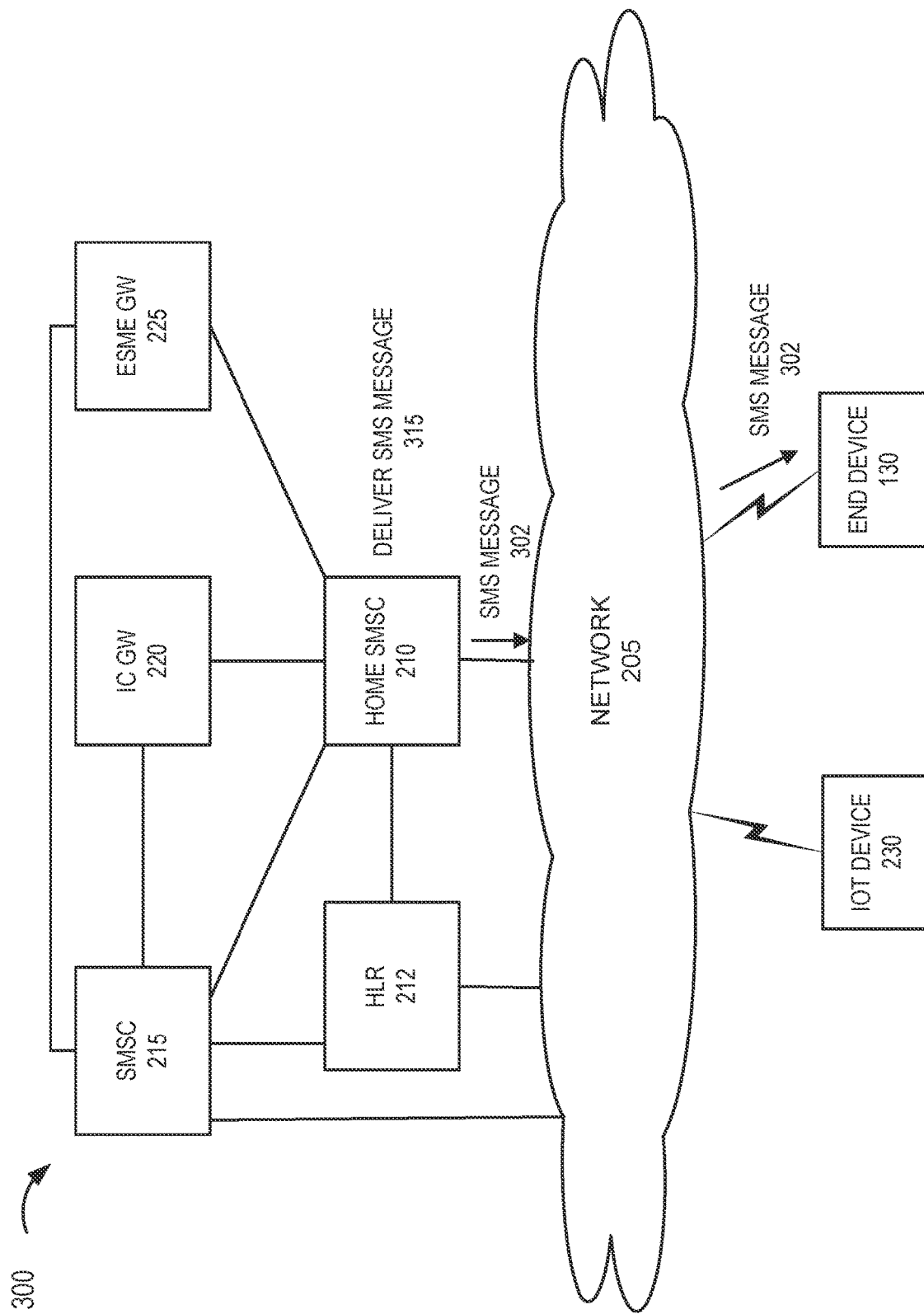

Referring to FIG. 3B, home SMSC 210 may determine recipient information 310. For example, home SMSC 210 may determine whether the destination is associated with the same carrier (e.g., Verizon, etc.) as IoT device 230. When end device 130 is associated with the same carrier, the delivery blocking service may allow the delivery of SMS message 302 to end device 130, as illustrated in FIG. 3C. According to some exemplary scenarios, it may be assumed that home SMSC 210 is also the home SMSC of end device 130.

Referring back to FIG. 3B, when the destination is not associated with the same carrier, home SMSC 210 may make other determinations pertaining to the recipient. For example, home SMSC 210 may determine whether the destination is an ESME. When the destination is an ESME, the delivery blocking service may allow the delivery of SMS message 302 to the ESME. For example, home SMSC 210 may transmit SMS message 302 to ESME GW 225, as illustrated in FIG. 3D. FIG. 3D illustrates an ESME 304 for description purposes.

Figure 3E:
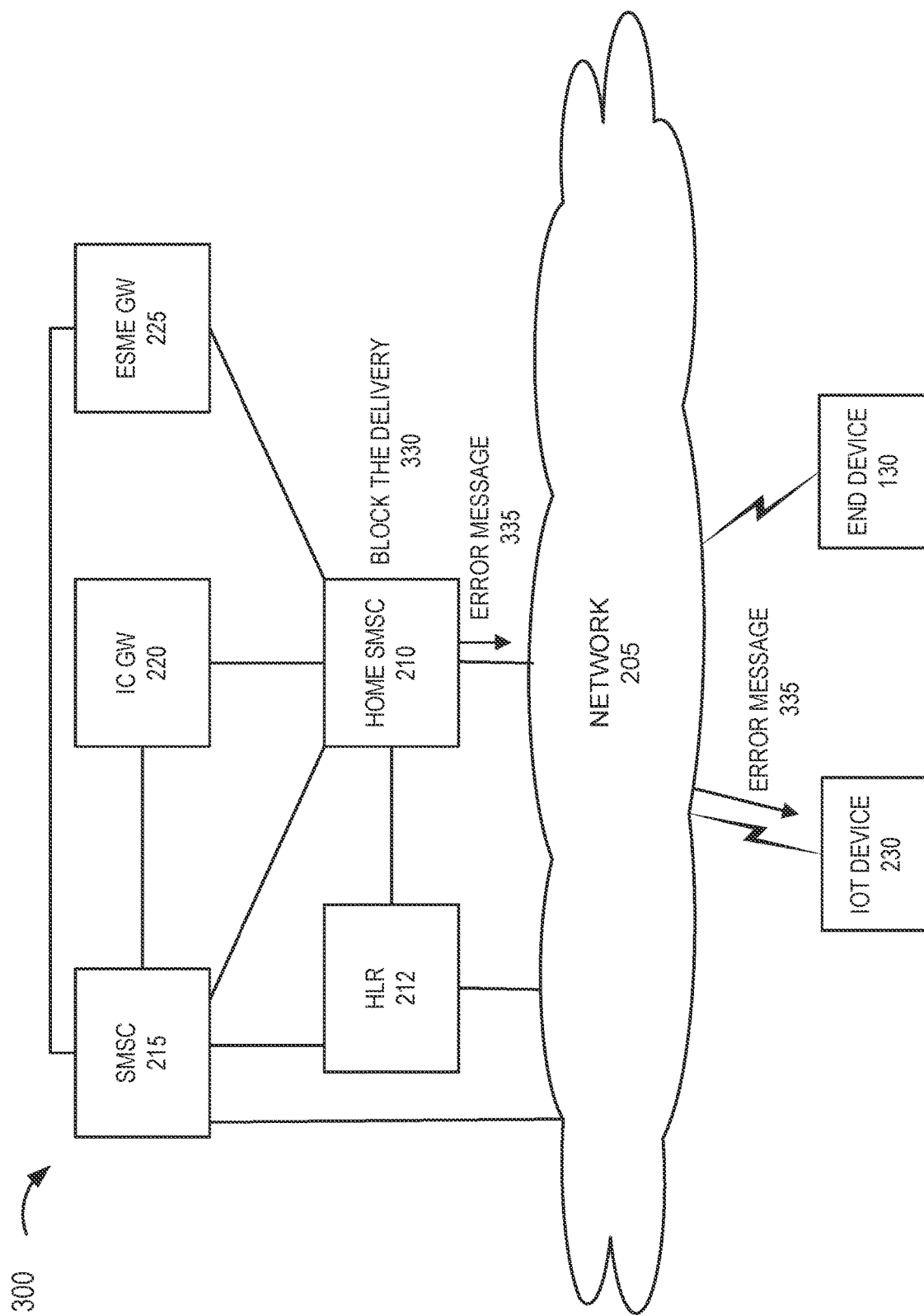

Referring back to FIG. 3B, when the destination is not associated with the ESME, home SMSC 210 may determine whether the destination is an international destination. When the destination is an international destination, according to an exemplary scenario, home SMSC 210 may determine that the identifier pertaining to IoT device 230 is subject to blocking delivery (e.g., of international SMS messages) and block the delivery 330 of SMS message 302, as illustrated in FIG. 3E. For example, the identifier associated with the addressing scheme of the blocking delivery service, as described herein, may indicate the MO device (e.g., IoT device 230) is subject to SMS delivery restrictions. By way of further example, the MSISDN of IoT device 230 may have a length greater than 10 digits or include a length greater than 10 digits and include a pre-defined value (e.g., 555, 99999, or other value), as previously described. According to other examples, other types of identifiers (e.g., IMSI, etc.) may be used, as described herein. Home SMSC 210 may also transmit an error message 335 to IoT device 230. Error message 335 may indicate that delivery of SMS message 302 was blocked, for example.

Figure 3F:
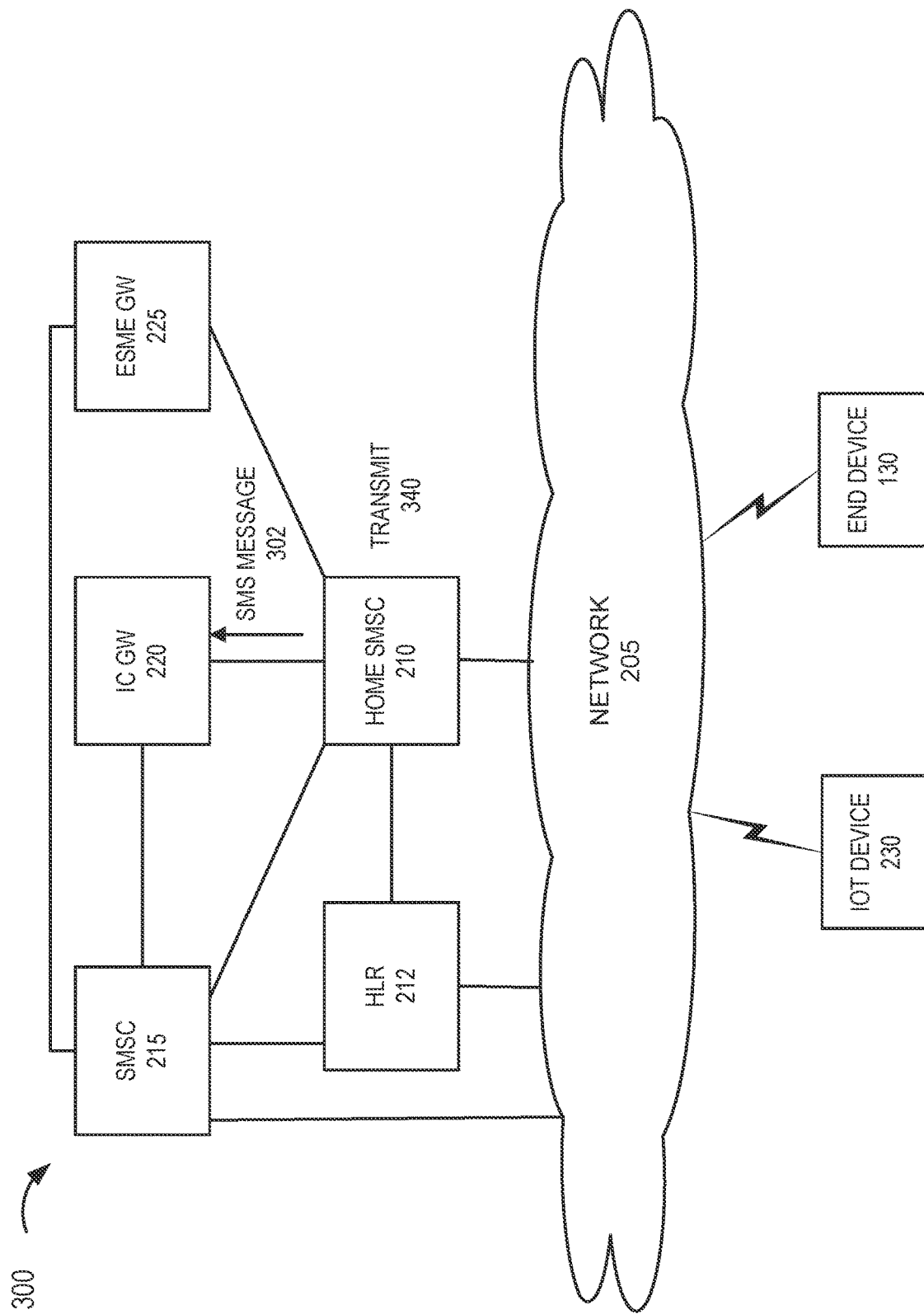

According to another exemplary scenario, when the destination is an international destination and based on the identifier of IoT device 230, home SMSC 210 determines that IoT device 230 is not subject to blocking delivery (e.g., of international SMS messages), home SMSC 210 may transmit 340 SMS message 302 to IC GW 220, as illustrated in FIG. 3F.

Figure 3G:
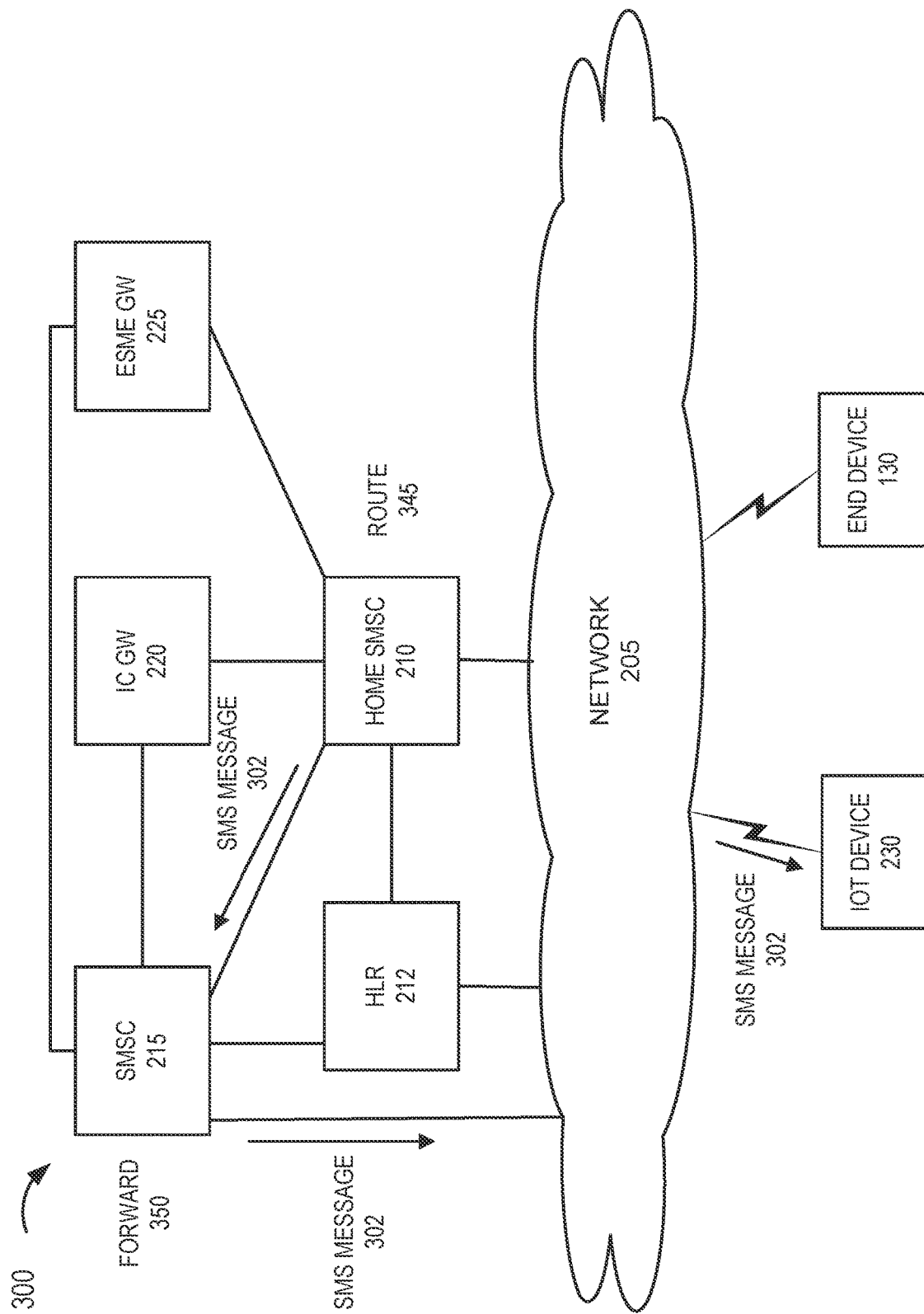

When the destination is served by another SMSC or other IC GW (not illustrated), home SMSC 210 may route 345 SMS message to the other SMSC (e.g., SMSC 215), as illustrated in FIG. 3G. For example, according to some exemplary embodiments, when home SMSC 210 is not the home SMSC for the recipient (e.g., end device 130), home SMSC 210 may forward SMS message 302 to another SMSC (e.g., SMSC 215). For purposes of illustration and description, assume that SMSC 215 is the home SMSC for end device 130. Similar to that previously described, SMSC 215 may determine whether the recipient is a subscriber of the carrier (e.g., VERIZON, etc.) associated with SMSC 215. For example, the MSISDN may be a 10-digit number but it may be uncertain whether the MSISDN is a phone number associated with VERIZON or another carrier (e.g., AT&T, etc.). When the recipient is the same, SMSC 215 may forward 350 the SMS message 302 to end device 130.

Figure 3H:
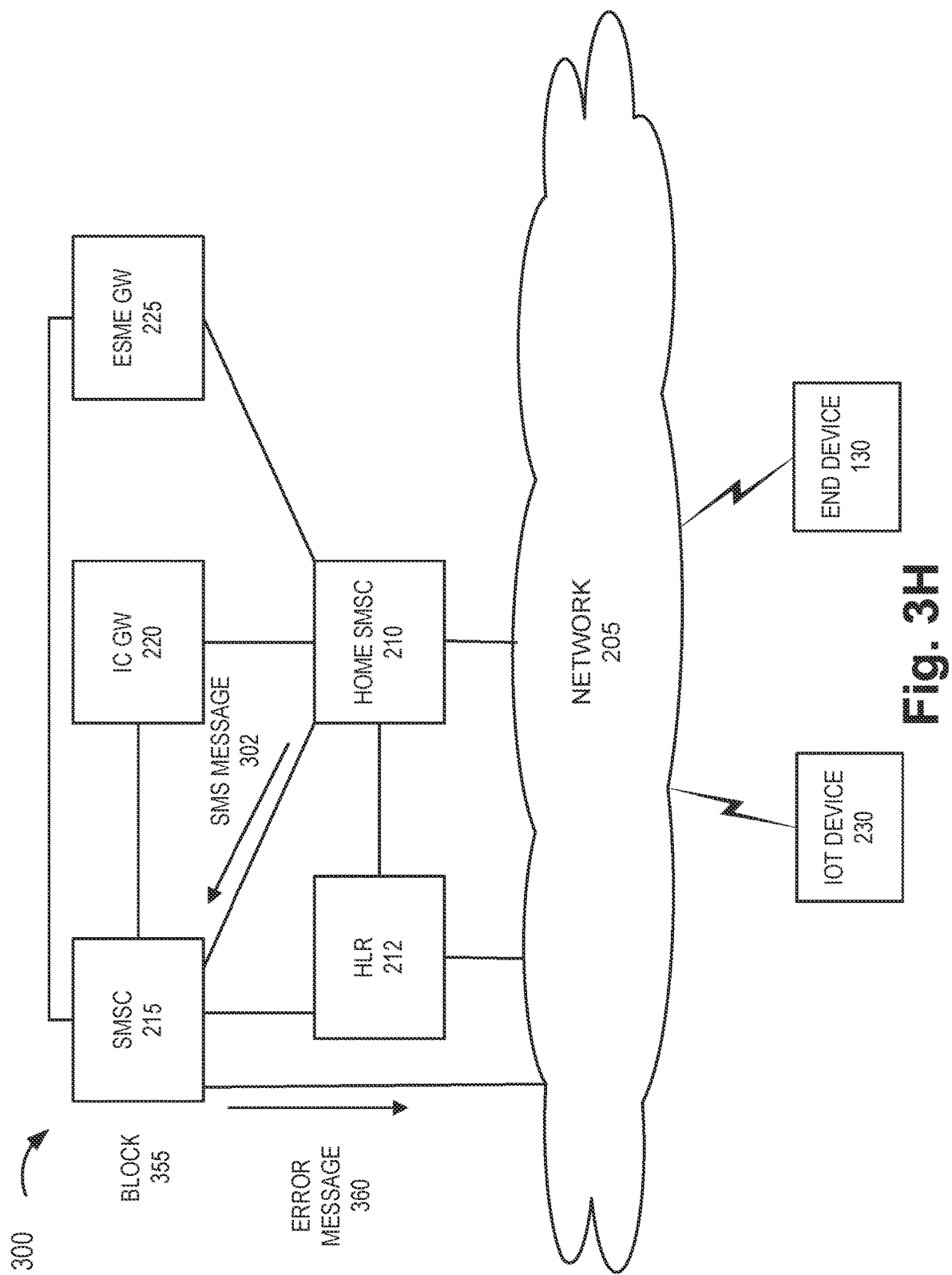
Figure 3I:
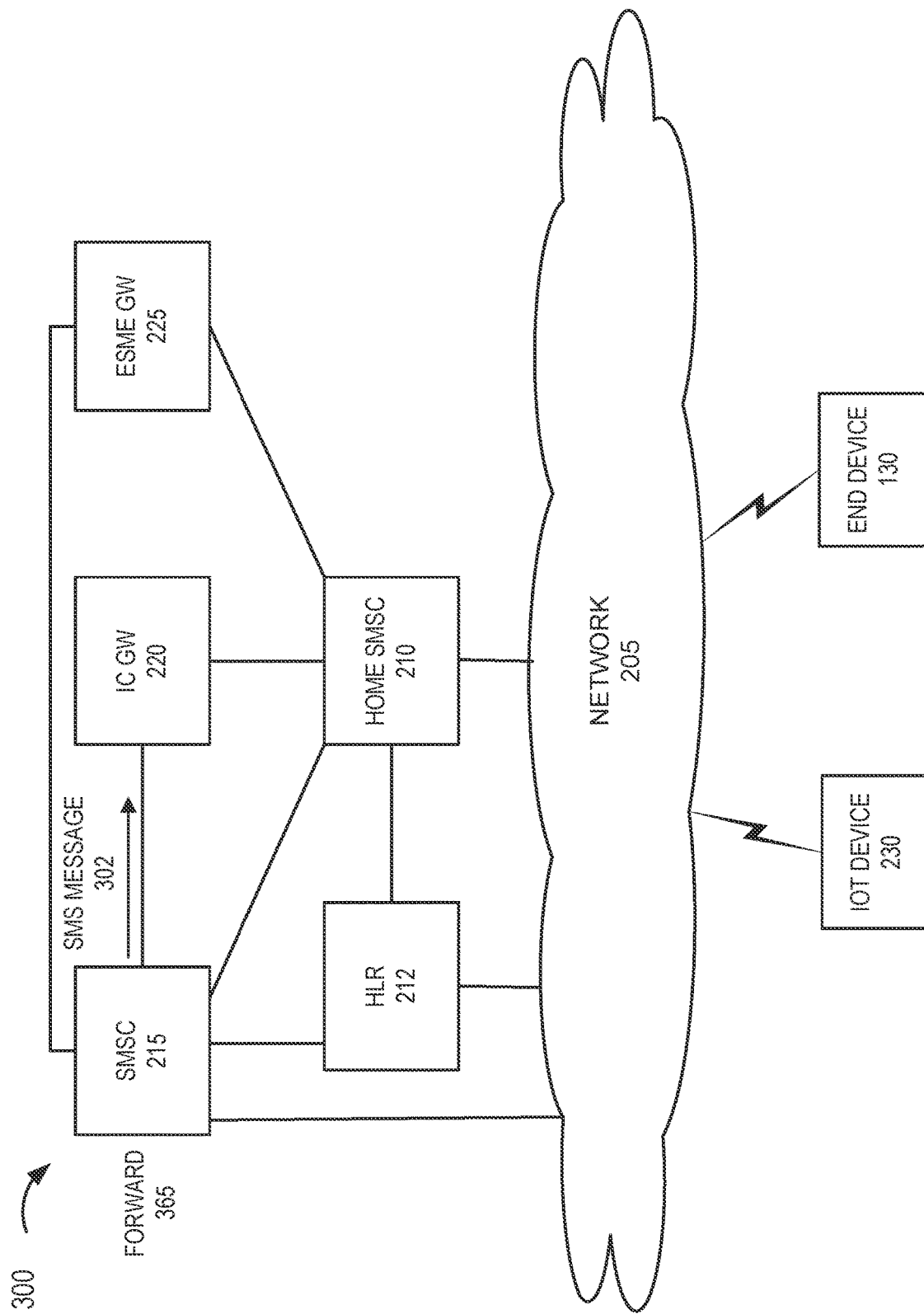

Referring to FIG. 3H, when the recipient is not the same, SMSC 215 may determine whether the identifier of the MO device is subject to the blocking delivery service. For example, according to an exemplary scenario, assume that the MSISDN of IoT device 230 (or other identifier pertaining to IoT device 230) indicates in view the addressing scheme that delivery of SMS message 302 to a domestic intercarrier destination is prohibited. As such, SMSC 215 may block 355 the delivery of SMSC 215 to IC GW 220. SMSC 215 may optionally send an error message 360 to IoT device 230 and/or to some other administration system, as previously described. On the other hand, referring to FIG. 3I according to another exemplary scenario, assume that the MSISDN of IoT device 230 (or other identifier pertaining to IoT device 230) indicates in view of the addressing scheme that delivery of SMS message 302 to a domestic intercarrier destination is permitted. SMSC 215 may forward 365 SMS message 302 to IC GW 220.

Although FIGS. 3A-3I illustrate an exemplary embodiment of a process of the blocking delivery service, according to other exemplary scenarios, the blocking delivery service may perform additional operations, fewer operations, and/or different operations than those illustrated and described. According to some exemplary embodiments, process 300 may pertain to a home SMSC delivery system. According to some exemplary embodiments, for a non-home SMSC delivery system, steps performed by SMSC 215 may be omitted from process 300.

Figure 4:
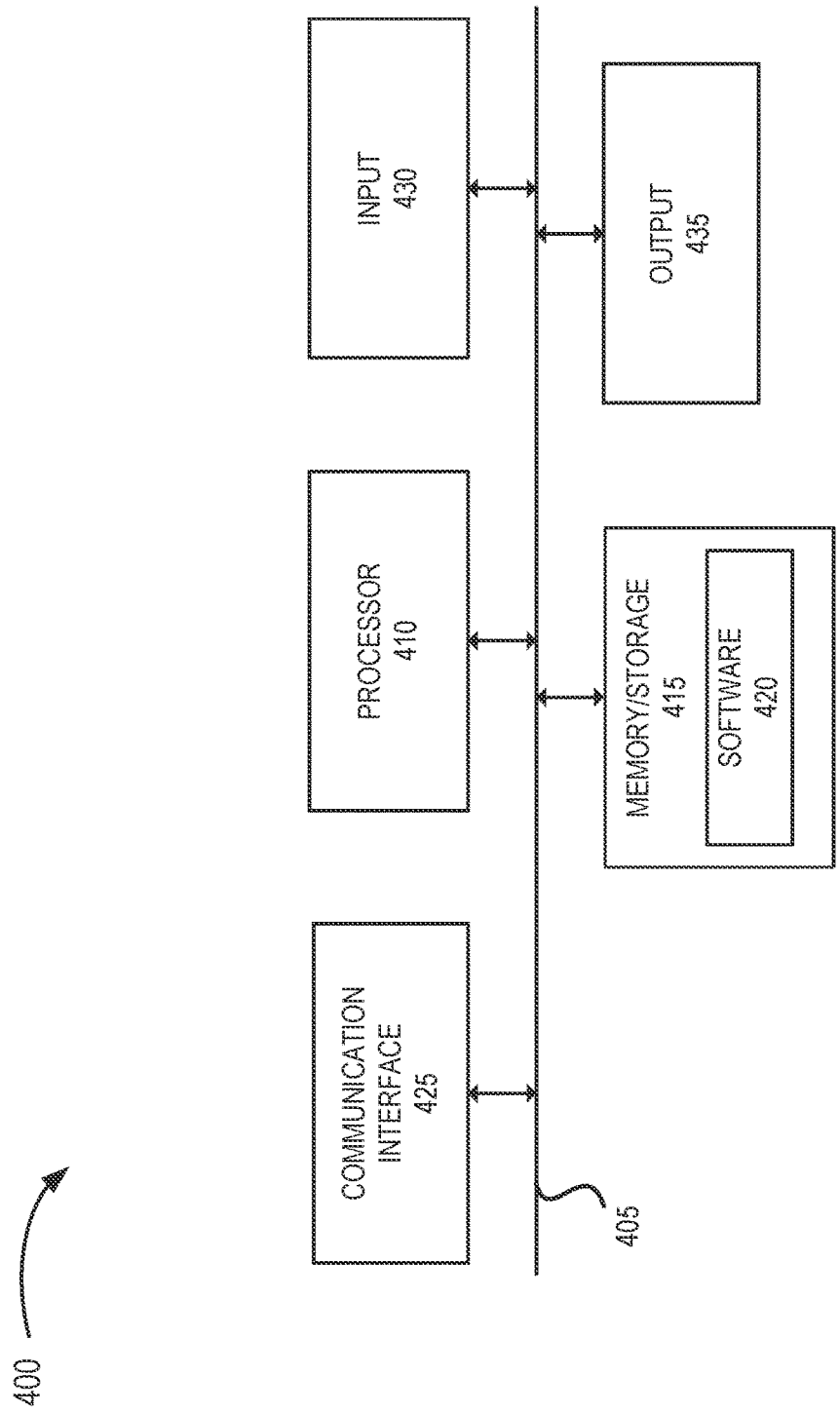
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to access device 107, external device 117, core device 122, end device 130, home SMSC 210, HLR 212, SMSC 215, IC GW 220, ESME GW 225, IoT device 230, and/or other types of network devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to home SMSC 210 and SMSC 215, software 420 may include an application that, when executed by processor 410, provides a function and/or a process of the blocking delivery service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service-based interface, or a reference interface, for example.

Input 430 permits an input into device 400. For example, input 430 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in an application service layer network (e.g., external network 115) and/or another type of network (e.g., access network 105, core network 120, etc.). Thus, network devices described herein may be implemented as device 400.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 performs a function or a process described herein based on the execution of hardware (processor 410, etc.).

Figure 5:
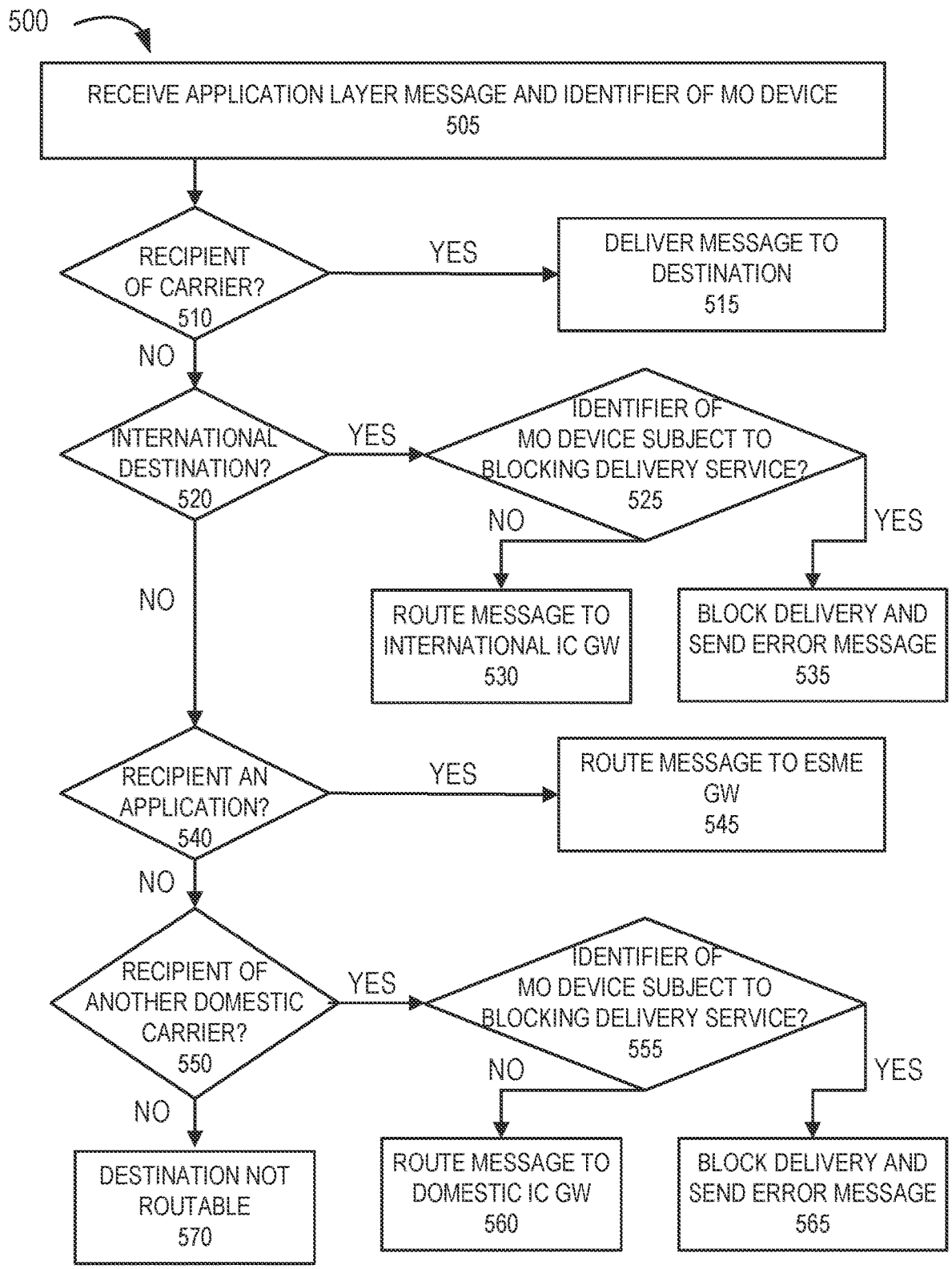
FIG. 5 is a flow diagram illustrating an exemplary process of an exemplary embodiment of the blocking delivery service.

FIG. 5 is a flow diagram illustrating an exemplary process 500 of an exemplary embodiment of the blocking delivery service. According to an exemplary embodiment, a messaging center (MC) device (e.g., SMSC, MMSC, or other type of messaging center device) may perform a step of process 500. According to an exemplary implementation, processor 410 executes software 420 to perform the step of process 500, as described herein. Alternatively, the step may be performed by execution of only hardware.

In block 505, an application layer message and identifier of an MO device may be received. For example, the MC device may receive an SMS message, an MMS message, or another type of application layer message (referred to as "message") from end device 130. The message may include an identifier pertaining to end device 130 and applicable to the addressing scheme of the blocking delivery service. The message may also include various field that may include application layer data, various parameters associated with SMS, MMS, or other application layer service, a destination address of another end device 130, ESME, etc.

In block 510, it may be determined whether the carrier of the recipient of the message is the same as the MO device and/or the carrier of the MC device. For example, the MC device may determine based on the message (e.g., destination information included in the message, etc.) and/or a lookup to local or external repositories (e.g., local databases, HLR, etc.), as described herein, whether the carrier of the recipient is the same. When the carrier of the recipient is the same (block 510—YES), the MC device may deliver the message to or towards its destination (block 515).

When the recipient is not the same (block 510—NO), it may be determined whether the destination of the message is international (block 520). For example, the MC device may inspect and/or analyze the message, and/or information obtained from a lookup, to determine whether the destination of the message is an international destination associated with the recipient. When there is an international destination (block 520—YES), it may be determined whether the identifier of the MO device is subject to the blocking delivery service (block 525). For example, the MC device may evaluate the identifier of end device 130 based on the addressing scheme of the blocking delivery service, as described herein. When the identifier is not subject to the blocking delivery service (block 525—NO), the message may be routed to an international IC GW (block 530). When the identifier is subject to the blocking delivery service (block 525—YES), the message may be blocked for delivery and an error message may be sent to the MO device (block 535).

In block 540, it may be determined whether the recipient is an application. For example, the MC device may inspect and/or analyze the message, and/or information obtained from a lookup, to determine whether the destination of the message is an ESME. When the destination is an application (block 540—YES), the message may be routed to an ESME GW (block 545).

When the destination is not an application (block 540—NO), it may be determined whether the recipient is of another domestic carrier (block 550). For example, the MC device may determine based on the message (e.g., destination information included in the message, etc.) and/or a lookup to local or external repositories (e.g., local databases, HLR, etc.), as described herein, whether the recipient is associated with another domestic carrier (e.g., relative to the MC device and/or the MO device). When the carrier of the recipient is associated with another domestic carrier (block 550—YES), it may be determined whether the identifier of the MO device is subject to the blocking delivery service (block 555). For example, the MC device may evaluate the identifier of end device 130 based on the addressing scheme of the blocking delivery service, as described herein. When the identifier is not subject to the blocking delivery service (block 555—NO), the message may be routed to a domestic IC GW (block 560). When the identifier is subject to the blocking delivery service (block 555—YES), the message may be blocked for delivery and an error message may be sent (block 565), such as to the MO device, an administration system, and/or the like.

When the carrier of the recipient is not associated with another domestic carrier (block 550—NO), the MC device may determine that the message is not routable (block 570). The MC device may send an error message to the MO device.

Although FIG. 5 illustrates an exemplary embodiment of a process of the blocking delivery service, according to other exemplary scenarios, the blocking delivery service may perform additional operations, fewer operations, and/or different operations than those illustrated and described. For example, the determinations illustrated and described in relation to blocks 510, 520, 540, and 550 are exemplary. According to other exemplary embodiments, the blocking delivery service may use additional, fewer, or different criteria to determine whether the message is blocked or delivered. In this regard, the criteria of the blocking delivery service are configurable and may differ according to various exemplary embodiments.

Additionally, or alternatively, the order of blocks 510, 520, 540, and 550 are exemplary and may be implemented in a different order. Alternatively, blocks 510, 520, 540, and 550 may be implemented concurrently in which a single analysis of the message and optionally other information (e.g., local/external information) may yield a determination applicable to all of blocks 510, 520, 540, 550, and 570. Alternatively, the outcome of one block may not be dependent on the execution of another block (e.g., the execution of block 540 may not be dependent on a negative outcome for block 520). Although not illustrated, after execution of blocks 515, 530, 535, 545, 560, 565, or 570, process 500 may end.

Figure 6:
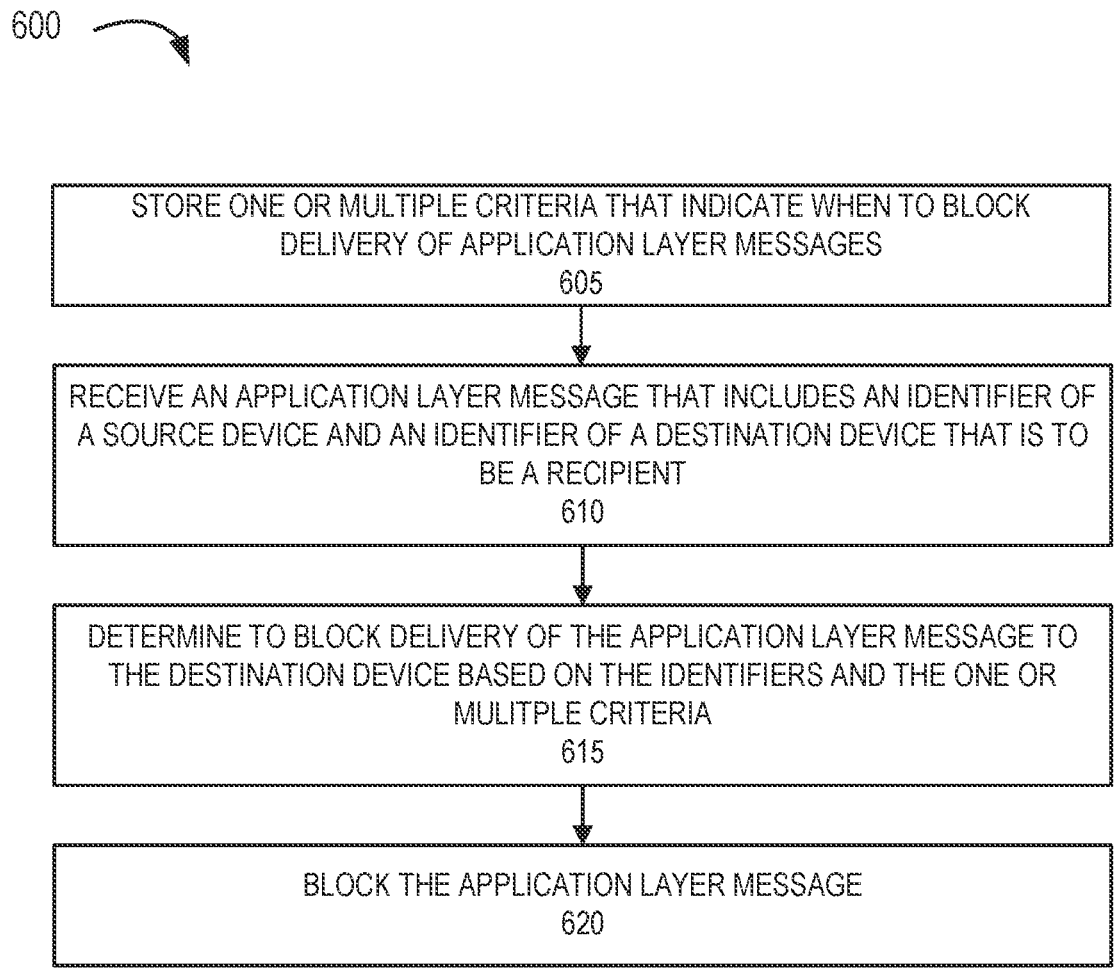
FIG. 6 is a flow diagram illustrating another exemplary process of an exemplary embodiment of the blocking delivery service.

FIG. 6 is a flow diagram illustrating another exemplary process 600 of an exemplary embodiment of the blocking delivery service. According to an exemplary embodiment, an application layer network device that provides an application service (e.g., SMSC, MMSC, a VoIP server, or other network device) may perform a step of process 600. According to an exemplary implementation, processor 410 executes software 420 to perform the step of process 600, as described herein. Alternatively, the step may be performed by execution of only hardware.

In block 605, the application layer network device may store one or multiple criteria that indicate when to block delivery of application layer messages. For example, the criteria may include information pertaining to the addressing scheme, such as certain identifiers, types of end devices, and/or other criterion, as described herein. The criteria may include information indicating prohibitive delivery, such as intercarrier/international destinations, intercarrier domestic destinations, and/or other configurable feature of relevance to an application service that may serve as a basis for blocking delivery.

In block 610, the application layer network device may receive an application layer message that includes an identifier of a source device, and an identifier of a destination device that is to be a recipient. For example, the message may include application layer service data. The identifiers may relate to the addressing scheme or correlate to identifiers of the addressing scheme. The application layer network device may access local or external information, which may correlate an identifier, if needed, or the correlation may be performed by the application layer network device.

In block 615, the application layer network device may determine to block delivery of the application layer message to the destination device based on the identifiers and the one or multiple criteria. In block 620, the application layer network device may block the application layer message. The application layer network device may optionally transmit an error message to the source device and/or other device or system.

Although FIG. 6 illustrates an exemplary embodiment of a process of the blocking delivery service, according to other exemplary scenarios, the blocking delivery service may perform additional operations, fewer operations, and/or different operations than those illustrated and described.

As previously described, the blocking delivery service may be implemented for application services different from a messaging service, as described herein. A network device, such as an application service server that provides the application service may include blocking delivery service logic that permits selective blocking or delivery of application layer data based on the addressing scheme, as described herein.

As set forth in this description and illustrated by the drawings, reference is made to "an exemplary embodiment," "exemplary embodiments," "an embodiment," "embodiments," etc., which may include a particular feature, structure or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described regarding the process illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   storing, by a network device, one or more criteria that indicate when to block delivery of application layer messages;
   receiving, by the network device from an end device, an application layer message that includes an identifier of the end device, a value appended to the identifier that indicates that the end device is subject to blocking delivery, and a destination address of another device that is to be a recipient of the application layer message;
   determining, by the network device based on the destination address, the identifier of the end device, the value, and the one or more criteria, to block delivery of the application layer message to the other device; and
   blocking, by the network device based on the determining, delivery of the application layer message.

2. The method of claim 1, wherein the one or more criteria indicate that delivery of the application layer messages that have an international destination is to be blocked.

3. The method of claim 1, wherein the one or more criteria indicate that delivery of the application layer messages that have a domestic intercarrier destination is to be blocked.

4. The method of claim 1, wherein the identifier of the end device is a Mobile Station International Subscriber Directory Number (MSISDN).

5. The method of claim 1, wherein the identifier of the end device has a value that is within a range of values indicating that the end device is subject to blocking delivery.

6. The method of claim 1, further comprising:
   transmitting, by the network device to the end device, a message indicating that delivery of the application layer message was blocked.

7. The method of claim 1, further comprising:
   analyzing, by the network device, the value; and
   determining, by the network device based on the analyzing, that the one or more criteria apply to the end device.

8. The method of claim 1, wherein the network device includes at least one of a Short Messaging Service Center (SMSC) device or a Multimedia Messaging Service Center (MMSC) device.

9. A network device comprising:
   a processor configured to:
      store one or more criteria that indicate when to block delivery of application layer messages;
      receive, from an end device, an application layer message that includes an identifier of the end device, a value appended to the identifier that indicates that the end device is subject to blocking delivery, and a destination address of another device that is to be a recipient of the application layer message;
      determine, based on the destination address, the identifier of the end device, the value, and the one or more criteria, to block delivery of the application layer message to the other device; and
      block, based on the determination, delivery of the application layer message.

10. The network device of claim 9, wherein the one or more criteria indicate that delivery of the application layer messages that have an international destination is to be blocked.

11. The network device of claim 9, wherein the one or more criteria indicate that delivery of the application layer messages that have a domestic intercarrier destination is to be blocked.

12. The network device of claim 9, wherein the identifier of the end device is a Mobile Station International Subscriber Directory Number (MSISDN).

13. The network device of claim 9, wherein the identifier of the end device has a value that is within a range of values indicating that the end device is subject to blocking delivery.

14. The network device of claim 9, wherein the processor is further configured to:
   transmit to the end device, a message indicating that delivery of the application layer message was blocked.

15. The network device of claim 9, wherein the processor is further configured to:
   analyze the value; and
   determine, based on the analysis, that the one or more criteria apply to the end device.

16. The network device of claim 9, wherein the network device includes at least one of a Short Messaging Service Center (SMSC) device or a Multimedia Messaging Service Center (MMSC) device.

17. A non-transitory computer-readable storage medium storing instructions executable by a processor of a network device, which when executed cause the network device to:
   store one or more criteria that indicate when to block delivery of application layer messages;
   receive, from an end device, an application layer message that includes an identifier of the end device, a value appended to the identifier that indicates that the end device is subject to blocking delivery, and a destination address of another device that is to be a recipient of the application layer message;
   determine, based on the destination address, the identifier of the end device, the value, and the one or more criteria, to block delivery of the application layer message to the other device; and
   block, based on the determination, delivery of the application layer message.

18. The non-transitory computer-readable storage medium of claim 17, wherein the one or more criteria include multiple criteria, and the multiple criteria include that delivery of the application layer messages that have an international destination is to be blocked and that delivery of the application layer messages that have a domestic intercarrier destination is to be blocked.

19. The non-transitory computer-readable storage medium of claim 17, wherein the identifier of the end device is a Mobile Station International Subscriber Directory Number (MSISDN).

20. The non-transitory computer-readable storage medium of claim 17, wherein the instructions comprise further instructions, which when executed, cause the network device to:
   analyze the value; and
   determine, based on the analysis, that the one or more criteria apply to the end device.

* * * * *